United States Patent
Keating et al.

(10) Patent No.: US 9,669,750 B2
(45) Date of Patent: Jun. 6, 2017

(54) VEHICLE OR TRAILER WITH DROPPING FLOOR

(71) Applicant: Aveling Barford (Holdings) Limited, Barnsley, Yorkshire (GB)

(72) Inventors: Alan Keating, Durnham (GB); David Roderick Lloyd, Huddersfield (GB); Brian Thomson, Barnsley (GB)

(73) Assignee: AVELING BARFORD (HOLDINGS) LIMITED, Yorkshire (GB)

( * ) Notice: Subject to any disclaimer, the term of this patent is extended or adjusted under 35 U.S.C. 154(b) by 0 days.

(21) Appl. No.: 14/649,700

(22) PCT Filed: Dec. 3, 2013

(86) PCT No.: PCT/GB2013/053200
§ 371 (c)(1),
(2) Date: Jun. 4, 2015

(87) PCT Pub. No.: WO2014/087154
PCT Pub. Date: Jun. 12, 2014

(65) Prior Publication Data
US 2015/0307012 A1    Oct. 29, 2015

(30) Foreign Application Priority Data
Dec. 4, 2012  (GB) .................................. 1221797.2

(51) Int. Cl.
*B60P 1/26* (2006.01)
*B60P 1/56* (2006.01)
*B60P 1/28* (2006.01)

(52) U.S. Cl.
CPC . *B60P 1/56* (2013.01); *B60P 1/26* (2013.01); *B60P 1/283* (2013.01); *B60P 1/286* (2013.01)

(58) Field of Classification Search
CPC .... B60P 1/56; B60P 1/26; B60P 1/286; B60P 1/283
(Continued)

(56) References Cited

U.S. PATENT DOCUMENTS

| 1,058,266 | A | * | 4/1913 | Saltzman | ........... | B62D 33/0273 |
| 3,402,837 | A | * | 9/1968 | Palmer | .................... | B65F 3/207 |

(Continued)

FOREIGN PATENT DOCUMENTS

| CN | 101973223 | 2/2011 |
| DE | 272440 | 10/1989 |

(Continued)

OTHER PUBLICATIONS

International Search Report corresponding to International Patent Application No. PCT/GB2013/053200, European Patent Office, dated Jun. 3, 2014, 4 pages.
(Continued)

*Primary Examiner* — Stephen Gordon
(74) *Attorney, Agent, or Firm* — Nixon Peabody LLP

(57) ABSTRACT

A loading bed for a load carrying vehicle or trailer, the loading bed having a base and including first and second body sections and an ejector type unloading mechanism, wherein the first body section has a base and a pair of opposing side walls, wherein the second body section has a base and a pair of opposing side walls, wherein the bases of the first and second body sections form at least a portion of the base of the loading bed, wherein the second body section is pivotably movable relative to the first body section between a first position and a second position, wherein the second body section is adapted to pivot relative to the first body section while the first body section remains fixed relative to a vehicle or trailer to which the loading bed is attached.

22 Claims, 2 Drawing Sheets

(58) Field of Classification Search
USPC .......... 298/1 B, 7, 23 MD, 23 S, 25, 27; 414/492, 511, 513, 517, 521
See application file for complete search history.

(56) References Cited

U.S. PATENT DOCUMENTS

| | | | |
|---|---|---|---|
| 3,441,153 A | | 4/1969 | Handley |
| 3,675,800 A | | 7/1972 | Weyant et al. |
| 3,827,753 A | * | 8/1974 | Pitts ................. B60P 1/006 298/1 B |
| 4,067,470 A | | 1/1978 | Felburn |
| 4,877,366 A | * | 10/1989 | De Filippi ........... B65F 3/201 298/23 MD |
| 5,352,084 A | * | 10/1994 | Hodgins ............. B65F 3/001 100/250 |
| 6,059,513 A | * | 5/2000 | Goby ................ B60P 1/006 |
| 6,189,976 B1 | | 2/2001 | Lawson |
| 7,326,023 B2 | * | 2/2008 | Hagenbuch ........... B60P 1/006 |
| 7,731,297 B1 | | 6/2010 | Ozanich |
| 2012/0195735 A1 | | 8/2012 | Daigle |

FOREIGN PATENT DOCUMENTS

| | | |
|---|---|---|
| FR | 229334 | 7/1976 |
| SU | 1087380 | 4/1984 |
| SU | 1756184 | 8/1992 |

OTHER PUBLICATIONS

GB Search Report corresponding to GB Patent Application No. GB1221797.2, dated Jul. 30, 2013, 4 pages.

English Translation of the Notification of the First Office Action from Chinese Patent Application No. 201380063306.5 dated Jun. 28, 2016.

* cited by examiner

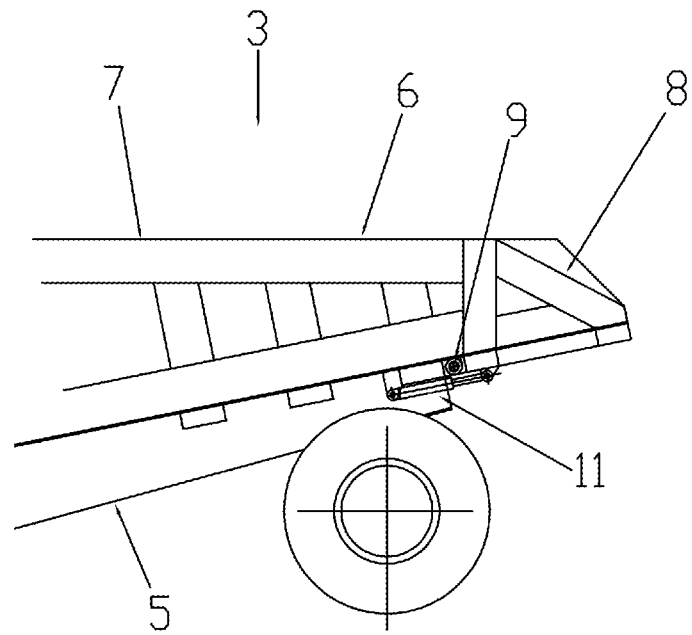
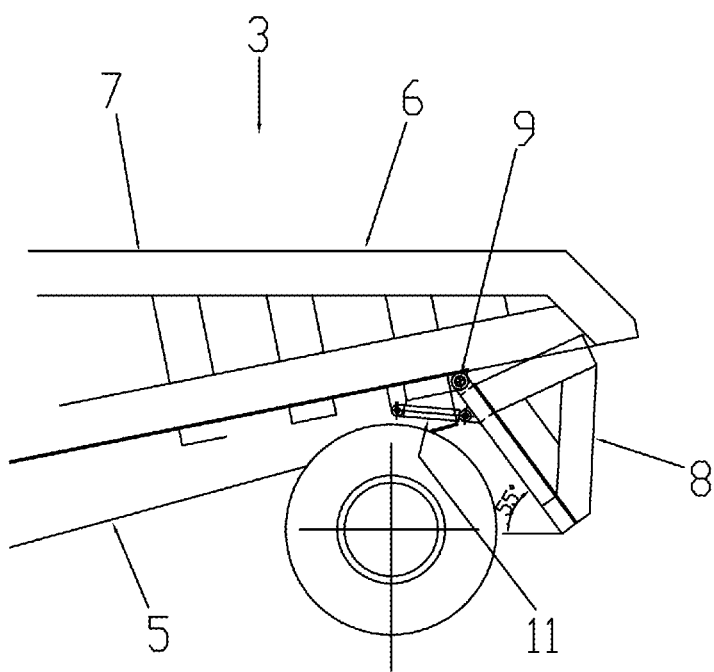

VEHICLE OR TRAILER WITH DROPPING FLOOR

CROSS REFERENCE TO RELATED APPLICATIONS

This application is a U.S. national stage of International Application No. PCT/GB2013/053200, filed Dec. 3, 2012, which claims priority to GB Application No. 1221797.2 filed on Dec. 4, 2012, both of which are incorporated herein in their entireties.

FIELD OF THE INVENTION

The invention relates to a loading bed for a load carrying vehicle or trailer, and to a vehicle or trailer having a loading bed.

BACKGROUND OF THE INVENTION

A load carrying vehicle or a trailer for a vehicle, for example an articulated dump truck (ADT), may have a loading bed for carrying a load. The loading bed may have an unloading mechanism for discharging a load carried by the loading bed. For example, the loading bed may have a tipper mechanism which lifts one end of the loading bed to pivot the loading bed about a pivot axis, thereby causing the load or a portion of the load to be tipped out of the loading bed. Alternatively, an ejector mechanism may sweep an ejector blade along the length of the loading bed, thereby sweeping the load or a portion of the load out of the loading bed.

It is generally desirable to maximise the loading capacity of an ADT or other load carrying vehicle or trailer. However, the desire to maximise load carrying capacity may lead to high requirements for the unloading mechanism. For example, the unloading mechanism may require large, heavy and expensive actuators, and may require a significant amount of power to discharge the load from the loading bed.

SUMMARY OF THE INVENTION

A first aspect of the invention provides a loading bed for a load carrying vehicle or trailer, the loading bed having a base and including first and second body sections, wherein the first body section has a base and a pair of opposing side walls, wherein the second body section has a base, wherein the bases of the first and second body sections form at least a portion of the base of the loading bed, wherein the second body section is pivotably movable relative to the first body section between a first position and a second position. The second body portion may therefore form a dropping floor or dropping door for the loading bed.

A second aspect of the invention provides a loading bed for a load carrying vehicle or trailer, the loading bed having a base and including first and second body sections, wherein the first body section has a base and a pair of opposing side walls, wherein the second body section has a base and a pair of opposing side walls, wherein the bases of the first and second body sections form at least a portion of the base of the loading bed, wherein the second body section is pivotably movable relative to the first body section between a first position and a second position. The second body portion may therefore form a dropping floor or dropping door for the loading bed.

A third aspect of the invention provides a loading bed for a load carrying vehicle or trailer, the loading bed having a base and including first and second body sections and an ejector type unloading mechanism, wherein the first body section has a base and a pair of opposing side walls, wherein the second body section has a base and a pair of opposing side walls, wherein the bases of the first and second body sections form at least a portion of the base of the loading bed, wherein the second body section is pivotably movable relative to the first body section between a first position and a second position, wherein the second body section is adapted to pivot relative to the first body section while the first body section remains fixed relative to a vehicle or trailer to which the loading bed is attached.

A loading bed or dump body is a portion of a vehicle or trailer having a base and side walls which is adapted to receive a load, for example rubble, earth, hard-core, building materials, snow or ice or any type of construction, waste or industrial material to be transported by the vehicle, and to discharge the load.

By pivotally moving the second body section relative to the first body section from its first position to its second position, the invention allows the volume loading capacity and/or the weight loading capacity of the loading bed to be varied. The loading bed may therefore discharge a portion of a load which it carries by moving the second body section relative to the first body section. A portion of the load carried by the loading bed may therefore be discharged before or during actuation of a main unloading mechanism (for example a tipper or ejector type unloading mechanism) which discharges the remainder of the load.

In this way the invention reduces loading requirements for the main unloading mechanism. The weight, complexity and cost of the main unloading mechanism may therefore be reduced. The invention may also reduce power requirements for operating the main unloading mechanism and allow the use of smaller actuators, thereby reducing the cost and weight of the loading bed. The rate at which the loading bed can discharge its load may also be increased.

The side walls of the second body section may reduce or substantially prevent spillage of a load being discharged from the loading bed over the side edges of the second body section. The side walls may reduce or prevent lateral spilling of load both as the second body section is moving from the first position towards the second position to discharge a portion of the load and as the main unloading mechanism is operating to discharge the remainder or a further portion of the load while the second body section is in its second position. Therefore the load may be deposited more accurately.

The second body section may be in a raised or closed configuration when it is in the first position and in a lowered or open configuration when it is in the second position.

The second body section may pivot relative to the first body section by at least 30 degrees, or at least 45 degrees, or at least 60 degrees between the first position and the second position. The angle of movement of the second body section may generally be any angle which allows discharge of a sufficient portion of a load carried by the loading bed when the second body section moves from its first position to its second position.

The base of the second body section, when in the second position, may be at an angle of at least 40 degrees, or at least 45 degrees, or at least 50 degrees, and less than 70 degrees, or less than 65 degrees, or less than 60 degrees to the ground when the loading bed or a vehicle or trailer having the loading bed is on flat, level ground. The angle of the base of the second body section to the ground may generally be any angle which allows discharge of a sufficient portion of a load carried by the loading bed when the second body section moves from its first position to its second position.

The base of the second body section, when in the second position, may, for example, be at an angle of approximately 55 degrees to the ground when the loading bed or a vehicle or trailer having the loading bed is on flat, level ground.

The second body section may be pivotally attached to the first body section. Alternatively the second body section may be pivotally attached to another component or components, for example to a chassis of a vehicle or trailer having the loading bed, or to another component attached to the first body section.

The base of the second body section may be pivotally attached to the base of the first body section. Alternatively the base or side walls of the second body section may be pivotally attached to the side walls of the first body section, or to another component or components, for example to a chassis of a vehicle or trailer having the loading bed, or to another component attached to the first body section.

Movement of the second body section between the first and second positions may be controlled by at least one actuator, preferably a hydraulic actuator.

The hydraulic actuator(s) may be equipped with burst hose protection.

The actuator(s) may be connected to the first body section and to the second body section. The actuator(s) may for example be connected to the first body section by one or more lugs extending from the first body section or by attachment to a frame or chassis to which the first body section is attached. The actuator(s) may for example be connected to the second body section by one or more lugs extending from the second body section. Alternatively the actuator(s) may be connected to the first and/or second body sections by a flexible linkage, for example a chain or cable, or by a rigid linkage, for example a stmt or lever.

The actuator(s) may be located below the first and second body sections. The actuator(s) may be located below a pivotal connection between the first and second body sections. Alternatively the actuator(s) may be located on one or both sides of the loading bed, for example outside the opposing side walls of the first and second body sections.

The actuator(s) may have a longitudinal axis which is substantially parallel to the base of the first body section when the second body section is in the first position. Alternatively the actuator longitudinal axis may be inclined at an angle to the base of the first body section when the second body section is in the first position.

The second body section may be locked in the first position by a locking mechanism.

For example the second body section may be locked in the first position by the actuator(s) and/or by a latch or other suitable locking mechanism.

The actuator may comprise one or more lock valves.

The second body section may be released from its first position and allowed to move towards its second position by disengaging or releasing the locking mechanism, for example by opening one or more lock valves or by disengaging a latch mechanism.

The second body section may move from its first position towards its second position under the action of its own weight and the weight of any portion of a load located in the second body section. The second body section may move from its second position back towards its first position under the action of the actuator(s).

Movement of the second body section from the first position towards the second position may not require any additional driving force, and may therefore be effected substantially without using any power. The actuator(s) may oppose the movement of the second body section from its first position towards its second position, for example to control the rate and/or extent of the movement. Alternatively the movement may be opposed by one or more dampers or may not be significantly opposed by any dampers or actuators. Alternatively the extent of movement may be controlled by one or more stops, for example rubber bump stops which prevent continued movement beyond the second position.

The side walls of the second body section may have a height in a direction extending substantially perpendicularly from the base of the second body section, and the height of each side wall of the second body section may decrease in a direction away from the first body section.

The base of the first body section may be at an angle within the range of 5 degrees to 15 degrees to the ground when the loading bed or a vehicle or trailer having the loading bed is on flat, level ground. Alternatively the base of the first body section may be substantially parallel with the ground or may be inclined at an angle of less than 5 degrees or more than 15 degrees to the ground. The base of the first body section may be at an angle of approximately 11 degrees to the ground.

The base of the second body section may be substantially co-planar with the base of the first body section when the second body section is in the first position. The bases of the first and second body sections may therefore combine to form a substantially continuous planar base of the loading bed. The base of the loading bed may be substantially planar substantially along its length when the second body section is in the first position. Alternatively the base of the second body section may be at an angle to the base of the first body section when the second body section is in the first position. For example, the base of the second body section may be pivotally raised above the base of the first body section when the second body section is in the first position. The angle of the second body section relative to the first body section may be selected to maximise load carrying capacity and/or ease of loading and unloading.

The volume loading capacity and/or the weight loading capacity of the loading bed may be substantially reduced when the second body section moves from the first position to the second position.

The volume loading capacity and/or the weight loading capacity of the loading bed may be reduced by at least 10%, or by at least 20%, or by at least 30%, or by approximately one third when the second body section moves from the first position to the second position. A portion of a load carried by the loading bed, for example at least 10% or at least 20% or at least 30% or approximately one third of the load may therefore be discharged from the loading bed by moving the second body section from its first positions towards its second position. The second body section may be pivoted downwardly to automatically release a substantial portion (for example at least 10% or at least 20% or at least 30%) of a maximum capacity load carried by the loading bed.

The loading bed may have a longitudinal direction, and the loading bed may have a length in its longitudinal direction, and the second body section may have a length in the longitudinal direction of the loading bed, and the length of the second body section may be at least 10%, or at least 20%, or at least 30%, or approximately one third of the length of the loading bed.

The loading bed may have a tipper or ejector type unloading mechanism.

The ejector unloading mechanism may include an ejector blade which moves substantially along the length of the first body section when it is operated to unload the loading bed. The ejector blade may not be adapted to move along the second body section. Alternatively the ejector blade may be adapted to moves substantially along the length of the first body section and partially or substantially along the length of the second body section. The ejector blade may be moved relative the first body section by one or more ejector cylinders, pistons or actuators acting between the ejector blade and the first body section or a frame or chassis attached to the first body section.

The tipper unloading mechanism may be operable to pivot the loading bed in a vertical plane.

A fourth aspect of the invention provides a vehicle or trailer for a vehicle having the loading bed.

The vehicle may be a dump truck, preferably an articulated dump truck. Alternatively the vehicle may be a rigid dump truck or may generally be any type of vehicle having a loading bed or dump body which is used to transport a load, preferably a loading bed or dump body which overhangs a front-most or rear-most axle of the vehicle. The loading bed may be located at the front or at the rear of the vehicle, and may be rigidly or pivotally connected to a single or multiple axle tractor unit.

The vehicle may be an off-road dump truck, for example an off-road articulated dump truck. An off-road dump truck is a dump truck which is specifically adapted for and primarily intended for off-road use (for example at a construction site) as opposed to an on-road dump truck which is designed primarily for on-road use. An off-road dump truck has wheels and tyres which are adapted for providing traction on rough or loose surfaces so that the dump truck may be operated satisfactorily on surfaces other than tarmac roads and compacted level tracks. An off-road dump truck also generally has sufficient ground clearance to enable operation over uneven surfaces.

The trailer may be a detachable trailer forming a rear wagon of a dump truck, preferably an articulated dump truck. The trailer may be interchangeable with other trailers so that any one of several different trailers may be attached to a front tractor unit to form an articulated dump truck.

The second body section may overhang to the front of a front-most axle or to the rear of rear-most axle of the vehicle or trailer. In some embodiments the entire second body section may overhang a front-most or rear-most axle, although in others only a portion may overhang. By overhanging or extending beyond a front-most or rear-most axle, the second body section may have an increased range of movement. The extent to which the loading bed overhangs the front-most or rear-most axle may define the maximum portion of its length which may be included in the pivoting second section. Preferably at least 10% or at least 20% or at least 30% or at least 40% of the loading bed by length overhangs a front-most or rear-most axle.

The invention may be applied to an existing loading bed of a vehicle or trailer, for example in a retrofit procedure. In this case a second section may be pivotally attached to the existing loading bed or alternatively a portion of the existing loading bed may be cut off or otherwise removed and pivotally reattached or replaced with a new pivotable second section. Alternatively the invention may be included when manufacturing a new loading bed for a vehicle or trailer.

Any of the features of any of the aspects of the invention may be combined with any of the features of any of the other aspect of the invention.

BRIEF DESCRIPTION OF THE DRAWINGS

Embodiments of the invention will now be described with reference to the accompanying drawings in which:

FIG. 3 illustrates a portion of a loading bed according to one embodiment of the invention with a dropping floor in a raised position; and FIG. 4 illustrates a portion of a loading bed according to one embodiment of the invention with a dropping floor in a lowered position.

DETAILED DESCRIPTION OF EMBODIMENT(S)

Figure 1:
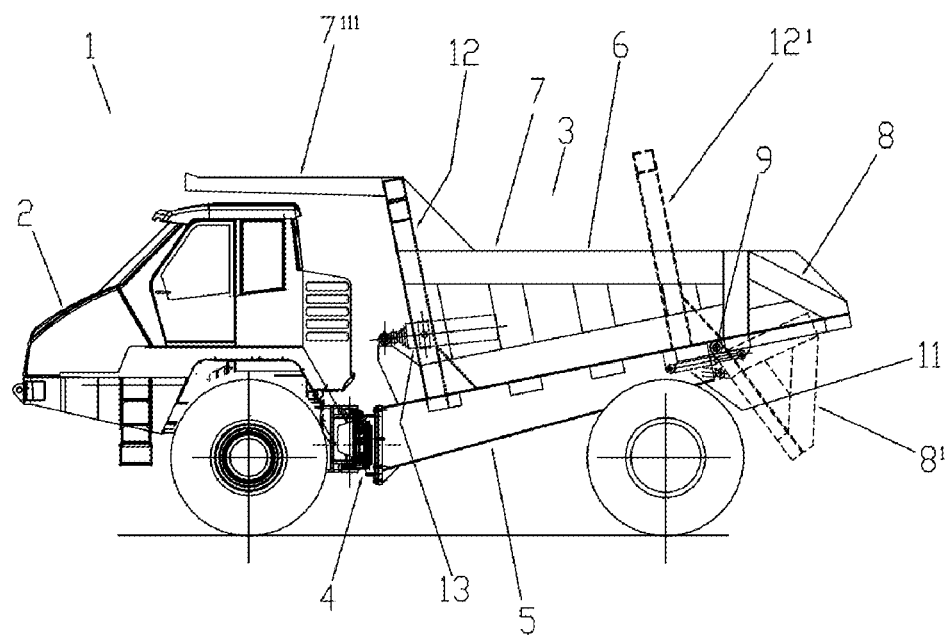
FIG. 1 illustrates a side view of an articulated dump truck (ADT) having a loading bed according to one embodiment of the invention.
Figure 2:
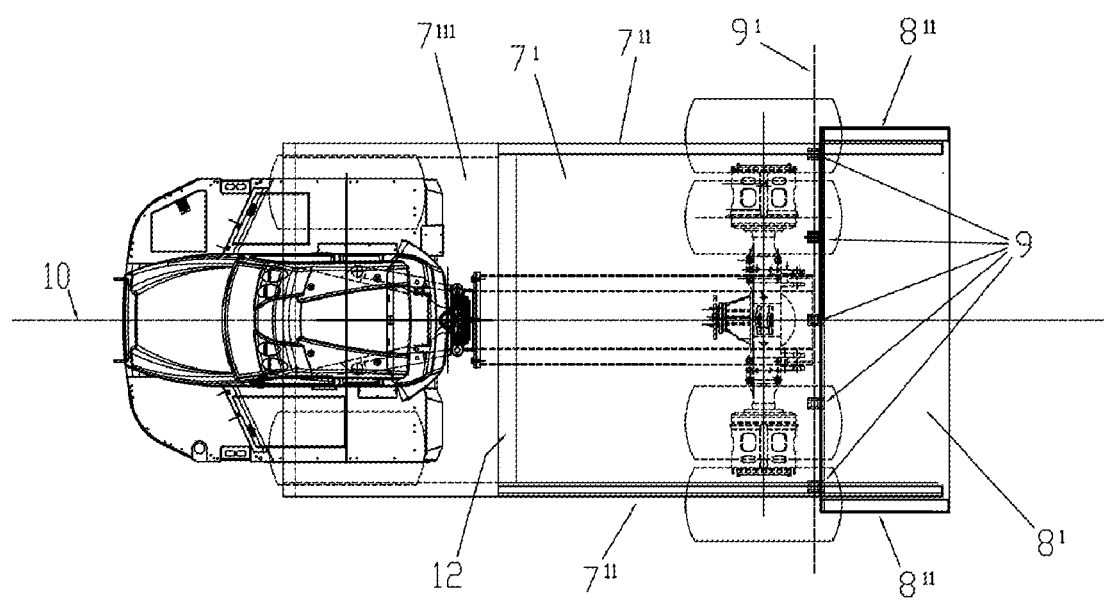
FIG. 2 illustrates a top view of an ADT having a loading bed according to one embodiment of the invention.

FIGS. 1 and 2 illustrate side and top views respectively of an ADT 1 having a front tractor 2 and a rear wagon 3. The rear wagon 3 may be permanently connected to the front tractor 2 or alternatively may be a detachable rear wagon or trailer which may be decoupled and separated from the front tractor allowing subsequent reattachment of the same rear wagon or attachment of a different rear wagon to the front tractor. The ADT 1 uses articulated steering, and has a pair of rams (not shown) which are used to pivot the front tractor 2 relative to the rear wagon to effect steering. The ADT 1 is for transporting and discharging loads, for example rubble, earth, hard-core, building materials or any type of construction, waste or industrial material, and may generally be used to transport any kind of load.

The front tractor 2 is a single axle drive unit comprising a cab from which an operator may control the ADT. The rear wagon 3 is connected to the front tractor at a pivot mechanism 4, and has a rear axle. The rear wagon 3 comprises a chassis 5 and a loading bed 6. The chassis 5 comprises a rigid frame which is connected to the front tractor 2 via the pivot mechanism 4, and the loading bed 6 is rigidly attached to the chassis.

The loading bed 6 comprises a first body section or main body 7 and a second body section or dropping floor 8 to the rear of the main body. The main body 7 comprises a base 7', a pair of opposing side walls 7" and a roof cover 7'" which partially extends over the cab of the front tractor 2. The main body 7 is rigidly connected to the chassis 5, for example by a welded joint. The dropping floor 8 comprises a base 8' and a pair of opposing side walls 8". The base 8' of the dropping floor 8 is pivotally connected to the base 7' of the main body 7 by several hinge points 9 located along the rear-most edge of the base of the main body. Each hinge point 9 comprises a hardened steel pin with bushes passing through lugs connected to the bases 7' and 8' of the main body 7 and dropping floor 8.

The bases 7' and 8' of the main body 7 and the dropping floor 8 are substantially co-planar and combine to form a substantially continuous planar base of the loading bed 6 in which a load to be carried by the ADT may be placed. The base of the loading bed 6 is inclined upwardly relative to the ground at an angle of approximately 11 degrees when the ADT 1 is on flat, level ground. By inclining the base of the loading bed 6 upwardly, the weight distribution of the ADT when fully loaded is improved because a greater portion of the weight of the load may be supported by the wheels of the front tractor.

The loading bed 6 has a longitudinal axis 10 (which is also the longitudinal axis of the ADT 1) and the base of the loading bed 6 has a length in the longitudinal direction 10. The base 7' of the main body provides approximately two thirds of the overall length of the base of the loading bed, and the dropping floor provides the remaining one third of the length. The rear most edge of the main body base 7' is located to the rear of the rear axle of the wagon 3, so that the entire dropping floor overhangs the rear axle.

The main body side walls 7" form side walls of the loading bed 6, which act to retain the load within the loading bed, and have upper edges which are substantially parallel with the ground when the ADT 1 is on flat, level ground. The main body side walls 7" extend rearwardly beyond the rear-most edge of the main body base 7' up to the rear-most edge of the dropping floor base 8', and overlap with the dropping floor side walls 8". The dropping floor side walls 8" are disposed on the outside of the main body side walls 7". The height of the dropping floor side walls 8" is substantially equal to that of the main body side walls at the front edge of the dropping floor 8 adjacent the main body 7, and decreases in a rearward direction away from the main body.

The loading bed comprises a pair of hydraulic actuators 11 disposed under the main body and dropping floor bases 7', 8'. Each actuator 11 has a first end which is connected to the rear of the chassis 5 via lugs extending from the chassis, and a second end connected to the dropping floor via lugs extending from the lower face of the dropping floor base 8'. Each actuator has a longitudinal axis which is substantially parallel with the loading bed longitudinal axis 10 and with the main body base 7'. Each actuator comprises an hydraulic cylinder and at least one lock valve for locking the actuator, and is equipped with burst hose protection.

The dropping floor 8 is pivotably movable relative to the main body 7 about axis 9' of the hinge points 9 between a first position, as shown in FIGS. 1 and 3, and a second position, as shown in FIG. 4 and in dashed lines in FIG. 1. The first position is a raised or closed position in which the dropping floor base 8' is substantially co-planar with the main body base 7' as described above. The loading capacity by weight and by volume of the loading bed 6 is maximised when the dropping floor 8 is in the first position. The second position is a lower or open position in which the dropping floor 8 has rotated about the common axis 9' of the hinge points 9 downwardly by an angle of approximately 66 degrees. The dropping floor base 8' is at an angle of approximately 55 degrees to the ground when the ADT 1 is on flat, level ground. In other embodiments the angle by which the dropping floor 8 rotates between the first and second positions and the angle at which the dropping floor is inclined to the ground may be different.

The loading capacity by weight and by volume of the loading bed 6 when the dropping floor 8 is in the second position is reduced by approximately two thirds compared to when it is in the first position. The dropping floor side walls 8" are adapted to partially overlap with the main body side walls 7" when the dropping door 8 is in the second position leaving substantially no gap between the dropping floor side walls and the main body side walls when viewed from the side of the ADT 1.

Movement of the dropping floor 8 between the first position and the second position is controlled by the hydraulic actuators 11. The hydraulic actuators 11 are operable to lock the dropping floor in the first position under the action of the lock valves. The hydraulic actuators 11 are operable to resist movement of the dropping floor 8 from the first position towards the second position, for example to control the rate and/or extent of the movement. The hydraulic actuators 11 are also operable to move the dropping floor 8 from the second position towards the first position.

The loading bed 6 comprises an ejector type main unloading mechanism for discharging a load carried by the loading bed. The ejector unloading mechanism comprises an ejector blade 12 which extends substantially across the width of the loading bed and extends from the base of the loading bed to above the upper edges of the main body side walls 7". The ejector blade 12 is movable substantially along the length of the main body base 7' (but not along the length of the dropping floor base 8') in the direction of the longitudinal axis 10 of the loading bed 6 between a forward position and a rearward position. In the forward position the ejector blade 12 is at the front end of the loading bed 6 adjacent the front tractor 2, as indicated in FIG. 1. In the rearward position the ejector blade 12 is at the front of the main body 7 adjacent the rear-most edge of the main body base 7', as indicated by the dashed line 12' in FIG. 1. The ejector blade is movable between the forward and rearward positions by two ejector cylinders 13 mounted to the chassis 5.

The trailer, when fully loaded and with the dropping floor 8 in the first position, may be unloaded according to the following steps:

a) An operator positions the ADT 1 at a location for ejecting the load
b) The operator requests an eject function to initiate ejection of the load
c) The lock valves of the hydraulic actuators 11 are released to allow the dropping floor to move away from the first position towards the second position
d) The dropping floor 8 moves from the first position towards the second position under the action of its own weight and the weight of any portion of the load which sits above the dropping floor base 8', the rate of the movement of the dropping floor 8 being controlled by the hydraulic actuators 11
e) The lock valves are actuated to lock the dropping floor in the second position
f) Approximately one third of the total load by volume is discharged from the loading bed 6 due to the movement of the dropping floor from the first position into the second position (although the actual amount discharged will depend on the nature of the load and its distribution within the loading bed 6 as well as the design of the loading bed itself)
g) After the dropping floor has reached the second position and discharged approximately one third of the total load the ejector cylinders 13 are actuated to move the ejector blade 12 from the forward position towards the rearward position 12'
h) As the ejector blade 12 moves rearwardly along the length of the loading bed towards the rear-most edge of the main body base the remaining load is swept along the loading bed and discharged
i) When the ejector blade 12 reaches the rear-most edge of the main body the ejection process is complete.

A similar process may also be used to eject only a portion of a load by moving the ejector blade only part of the way from the forward position towards the rearward position. A similar process may also be used to eject a partial load, that is a load which is not equal to the maximum loading capacity of the loading bed 6 by volume or by weight, although in this case the proportion of the load discharged by lowering the dropping floor may be significantly reduced.

By lowering the dropping floor to discharge a portion of the load before or during actuation of the ejector unloading mechanism to discharge the remaining load, the weight of the load being swept by the ejector blade and the distance across which the load must be swept is reduced, and therefore the operating requirements for the ejector mechanism are reduced. For example the force required to move the ejector blade 12 is reduced so that power consumption for unloading is reduced and smaller, lighter and less expensive ejector cylinders 13 may be used. The ejector cylinders 13 are also only required to move the ejector blade along the first two thirds of the overall length of the loading bed 6 so that shorter actuators may be used. The load transmitted through the ejector blade 12 is also reduced so that the ejector blade and other components of the ejector actuation mechanism may have a reduced cost and weight. The rate at which the loading bed can discharge its load may also be increased because the first third of the load may be discharged more rapidly by lowering the dropping floor than by moving the ejector blade 12.

The dropping floor side walls 8" substantially prevent lateral spillage of the load over the sides of the dropping floor 8 so that the load may be deposited more accurately.

Operation of the dropping floor 8 uses substantially no power because movement from the first position to the second position is effected through the action of the weight of the dropping door and the load. Therefore power consumption for the overall ejection system is reduced.

In one embodiment of the invention an ADT may be adapted to use the invention by modifying an existing loading bed. Alternatively a detachable rear wagon which may be coupled to the front tractor may be modified, or a new detachable rear wagon may be produced incorporating the dropping floor.

The dropping floor 8 may be operated automatically before or at the same time as operation of the ejector blade 12 or alternatively may be operated independently of the ejector mechanism, for example to discharge only a portion of the load.

In an alternative embodiment the ADT 1 may have a tipper unloading mechanism instead of an ejector unloading mechanism. In this case the ADT may include one or more tipper cylinders which are operable to raise the end of the loading bed 6 closest to the front tractor to pivot the loading bed about a pivot axis and discharge the remaining load in the loading bed after operation of the dropping floor 8. In some embodiments the hydraulic or additional actuators may be used to move the dropping floor 8 away from the second position back towards the first position as the loading bed is tipped to maintain clearance of the dropping floor over the rear tyres of the rear wagon 3.

Any feature or combination of features from any of the embodiments described above may be appropriately combined with any feature or combination of features from any other embodiment or embodiments.

Although the invention has been described above with reference to one or more preferred embodiments, it will be appreciated that various changes or modifications may be made without departing from the scope of the invention as defined in the appended claims. In particular the invention is not limited to use for ADTs but may also be applied to any loading bed of a vehicle or trailer, including non articulated dump trucks and front loading vehicles.

The invention claimed is:

1. A loading bed of a load carrying vehicle or trailer, the loading bed having a base and including first and second body sections and an ejector type unloading mechanism, wherein the first body section has a base and a pair of opposing side walls, wherein the second body section has a base and a pair of opposing side walls, wherein the bases of the first and second body sections form at least a portion of the base of the loading bed, wherein the second body section is pivotably movable relative to the first body section between a first position and a second position, wherein the second body section is adapted to pivot relative to the first body section while the first body section remains fixed relative to the vehicle or trailer to which the loading bed is attached, wherein the second body section is in a raised or closed configuration when it is in the first position and in a lowered or open configuration when it is in the second position, wherein the base of the second body section is substantially co-planar with the base of the first body section when the second body section is in the first position.

2. A loading bed according to claim 1, wherein the second body section is pivotable relative to the first body section by at least 30 degrees between the first position and the second position.

3. A loading bed according to claim 1, wherein the first body section is fixed so as to be non-movable with respect to the vehicle or trailer to which the loading bed is attached.

4. A loading bed according to claim 1, wherein the second body section is pivotally attached to the first body section.

5. A loading bed according to claim 1, wherein movement of the second body section between the first and second positions is controlled by at least one actuator.

6. A loading bed according to claim 5, wherein the actuator is connected to the first body section and to the second body section.

7. A loading bed according to claim 5, wherein the actuator has a longitudinal axis which is substantially parallel to the base of the first body section when the second body section is in the first position.

8. A loading bed according to claim 5, wherein the actuator is located below the first and second body sections.

9. A loading bed according to claim 8, wherein the actuator is located below a pivotal connection between the first and second body sections.

10. A loading bed according to claim 1, wherein the second body section is locked in the first position by a locking mechanism.

11. A loading bed according to claim 5, wherein the second body section is locked in the first position by a locking mechanism, and wherein the second body section is locked in the first position by the actuator.

12. A loading bed according to claim 11, wherein the actuator comprises one or more lock valves.

13. A loading bed according to claim 1, wherein the base of the first body section is at an angle within the range of 5 degrees to 15 degrees to the ground when the loading bed of the vehicle or trailer is on flat, level ground.

14. A loading bed according to claim 1, wherein the base of the second body section is raised above the base of the first body section when the second body section is in the first position.

15. A loading bed according to claim 1, wherein the volume loading capacity, or the weight loading capacity, of the loading bed is reduced by at least 10% when the second body section moves from the first position to the second position.

16. A loading bed according to claim 1, wherein the loading bed has a longitudinal direction, wherein the loading bed has a length in its longitudinal direction, wherein the second body section has a length in the longitudinal direction of the loading bed, and wherein the length of the second body section is at least 10% of the length of the loading bed.

17. A loading bed according to claim 1, wherein the vehicle is a dump truck.

18. A loading bed according to claim 17, wherein the trailer is a detachable trailer forming a rear wagon of the dump truck.

19. A loading bed according to claim 1, wherein the second body section overhangs to the front of a front-most or to the rear of rear-most axle of the vehicle or trailer.

20. A loading bed according to claim 1, wherein the vehicle is an articulated dump truck.

21. A loading bed of a load carrying vehicle or trailer, the loading bed comprising:
    a base;
    first and second body sections; and
    an ejector type unloading mechanism,
    wherein the first body section has a base and a pair of opposing side walls, wherein the second body section has a base and a pair of opposing side walls, wherein the bases of the first and second body sections form at least a portion of the base of the loading bed, wherein the second body section is pivotably movable relative to the first body section between a first position and a second position, wherein the second body section is adapted to pivot relative to the first body section while the first body section remains fixed relative to the vehicle or trailer to which the loading bed is attached, wherein the base of the second body section is pivotally attached to the base of the first body section, wherein the base of the second body section is substantially co-planar with the base of the first body section when the second body section is in the first position.

22. A loading bed of a load carrying vehicle or trailer, the loading bed comprising:
    a base;
    first and second body sections; and
    an ejector type unloading mechanism,
    wherein the first body section has a base and a pair of opposing side walls, wherein the second body section has a base and a pair of opposing side walls, wherein the bases of the first and second body sections form at least a portion of the base of the loading bed, wherein the second body section is pivotably movable relative to the first body section between a first position and a second position, wherein the second body section is adapted to pivot relative to the first body section while the first body section remains fixed relative to the vehicle or trailer to which the loading bed is attached, wherein the second body section is in a raised, or closed, configuration when it is in the first position and in a lowered, or open, configuration when it is in the second position, wherein the side walls of the second body section have a height in a direction extending substantially perpendicularly from the base of the second body section, wherein the height of each side wall of the second body section decreases in a direction away from the first body section.

* * * * *